Dec. 23, 1969    N. C. NITSCHKE    3,485,616
GLASS SHEET CONVEYING AND TREATING APPARATUS
Filed Aug. 12, 1966    2 Sheets-Sheet 1
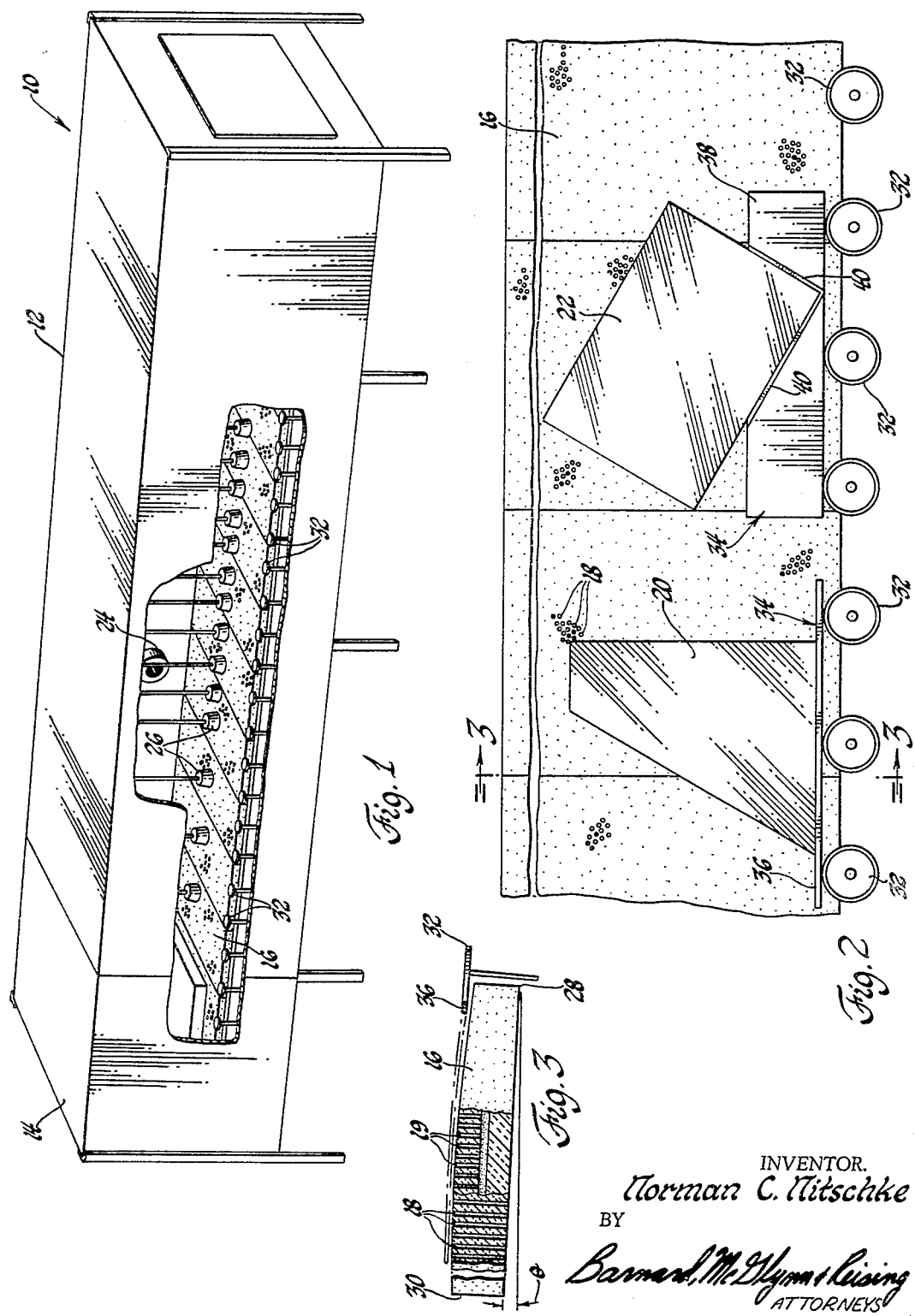
INVENTOR.
Norman C. Nitschke
BY
Barnard, McElynn & Rising
ATTORNEYS Dec. 23, 1969   N. C. NITSCHKE   3,485,616
GLASS SHEET CONVEYING AND TREATING APPARATUS
Filed Aug. 12, 1966   2 Sheets-Sheet 2
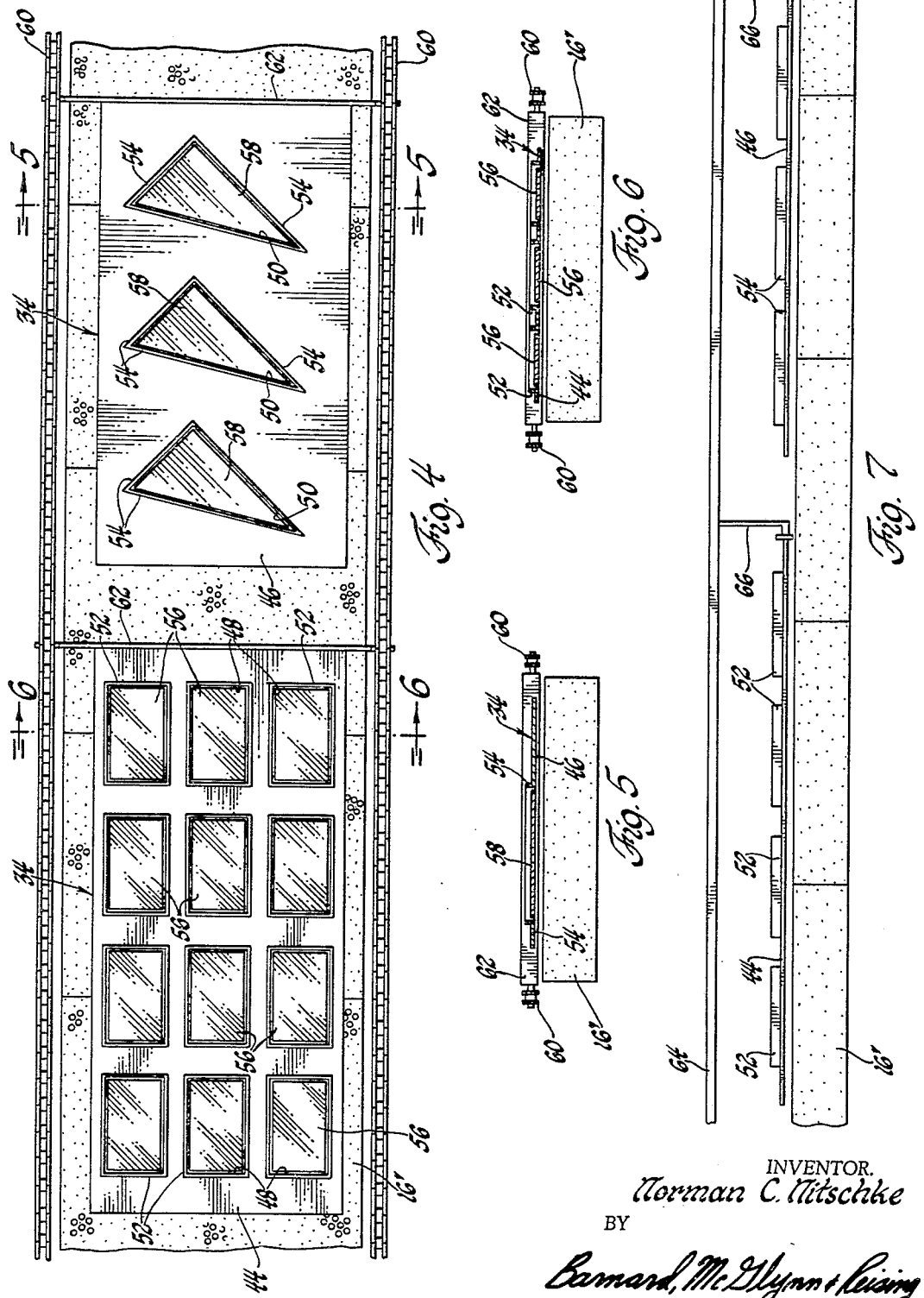
INVENTOR.
Norman C. Nitschke
BY
Barnard, McGlynn & Reising
ATTORNEYS United States Patent Office 3,485,616
Patented Dec. 23, 1969

3,485,616
GLASS SHEET CONVEYING AND
TREATING APPARATUS
Norman C. Nitschke, Perrysburg, Ohio, assignor to Permaglas, Inc., Woodville, Ohio, a corporation of Ohio
Filed Aug. 12, 1966, Ser. No. 572,080
Int. Cl. C03b 18/00
U.S. Cl. 65—182                    18 Claims

ABSTRACT OF THE DISCLOSURE

An apparatus for treating sheets of glass including an elongated support bed for supporting a sheet of glass on fluid over the bed with a conveying means disposed along the bed for moving the respective sheets of glass therealong. The improvement is a guide means which is removably disposed over the bed and in engagement with the sheet to position the sheet in a predetermined orientation and with the guide means being in removable frictional and driven engagement with the conveying means whereby the guide means may be moved independently of and away from the conveying means.

A superior quality of glass is obtainable by utilization of a recent major development in the treating of sheet glass wherein sheets of glass are floated on gases while being heated for annealing, tempering and/or curving and the like. Such treatment is accomplished in an elongated furnace having an elongated bed supported within the furnace with passages in the bed for supplying hot gases over the bed to support the sheets on the gases as the sheets are moved along the bed by a conveyor. As a sheet of glass is moved along the bed while floating on the hot gases, it is heated to a temperature sufficient for bending and/or tempering or annealing. Devices of this type are more specifically described and illustrated in U.S. Patent No. 3,223,501 which issued Dec. 14, 1965, and in U.S. Patent 3,338,697 in the names of Harold A. McMaster and Norman C. Nitschke and assigned to the assignee of the instant invention.

As illustrated in the aforementioned patent, the conveyor for moving the respective sheets of glass along the bed comprises a plurality of rotating rollers disposed along one longitudinal edge of the bed. A plurality of the rollers are in contact with an edge of a floating sheet of glass at all times during the movement of the sheet along the bed. Thus, each sheet successively contacts the rollers as it is moved along the bed by the rollers. In the aforementioned Patent 3,338,697, an apparatus is described which utilizes an endless loop chain conveyor having one reach of the loop disposed along the bed. Fingers or arms extend from the chain and over the bed in a direction transverse to the movement of the chain. The sheets of glass engage or rest against the ends of the fingers or arms and are, therefore, moved along the bed as the fingers or arms move along the bed. These fingers or arms are rigidly secured to the chain at predetermined distances apart.

In treating sheets of glass with either of the apparatuses disclosed in the above-mentioned patents, it is frequently desirable to treat various different shapes of flat sheets of glass. In addition, it is frequently desirable to treat sheets of glass in such apparatuses wherein the sheets of glass are not large enough to at all positions span the distance between adjacent rollers or to expand the distance between adjacent fingers or arms extending from the conveyor. Furthermore, in each of the apparatuses illustrated and described in the above-mentioned patents, at least a portion of the bed is preferably curved in a direction transverse to the direction of movement of the sheets of glass so that as a sheet of glass is moved along the bed and heated, it will conform with the curvature of the bed. In each of the above apparatuses, an edge of a sheet of glass is in contact with either the rollers or the fingers or arms extending from the loop-type conveyor as it moves along the bed and, therefore, the orientation of each sheet of glass is limited to the orientation resulting when one edge of the sheet of glass is engaging the conveying means. Thus, there is no flexibility in such apparatuses whereby sheets of substantially the same configuration may be oriented differently as they move along the bed, which different orientations are desirable to bend or curve successive sheets of glass about different axes thereof.

Accordingly, it is an object and feature of this invention to provide guide means for engaging a sheet of glass in such apparatuses to guide various sizes of sheets of glass and to position each sheet of glass in a particular predetermined orientation while the guide means is in frictional driven engagement with the conveyor, thus allowing various different configurations of guide means to be utilized to guide various sizes of sheets of glass and to orient sheets of glass having substantially the same configuration in various different manners as they are floated along the bed.

Other objects and attendant advantages of this invention will be readily appreciated as the same becomes better understood by reference to the following detailed description when considered in connection with the accompanying drawings wherein:

FIGURE 1 is a perspective view of an apparatus for treating sheet glass in accordance with the instant invention;

FIGURE 2 is a plan fragmentary view showing sheets of glass moving along a bed in accordance with the instant invention;

FIGURE 3 is a cross-sectional view taken substantially along line 3—3 of FIGURE 2;

FIGURE 4 is a fragmentary plan view showing alternative embodiments of the instant invention of moving floating sheets of glass along the bed;

FIGURE 5 is a cross-sectional view taken substantially along line 5—5 of FIGURE 4;

FIGURE 6 is a cross-sectional view taken substantially along the line 6—6 of FIGURE 4; and FIGURE 7 is a side elevational view showing an alternative conveying means and its coaction with the guide means of the instant invention.

Referring now to the drawings, wherein like numerals indicate like or corresponding parts throughout the several views, a apparatus for treating sheets of glass is generally shown at 10. The apparatus 10 includes an enlongated furnace 12 and a blasthead 14. An elongated bed 16 is disposed within the furnace 12 and extends into the blasthead 14. The blasthead 14 is normally utilized for cooling sheets of glass, such as for annealing, tempering or the like.

The bed 16 includes a plurality of spaced passages 18 therein for supplying fluid such as hot gases above the bed to support the sheets of glass 20 and 22. There is included means comprising the blowers 24 for circulating the hot gases through the furnace and through the passages 18. The bed 16 also includes a plurality of fluid exhaust passages 19 therein. A plurality of burners or heaters 26 are disposed above the bed 16 for heating the sheets of glass and hot gases within the furnace. The bed 16 and the hot gas circulation system, therefore, provide a flow control means for at least partially supporting the respective sheets of glass on the hot gases.

In FIGURES 1 through 3, the illustrated bed 16 is tilted an angle θ about a longitudinal axis so that one longitudinal edge 28 is lower than the other longitudinal edge 30.

There is also included conveying means comprising the rollers 32 disposed along the lower longitudinal edge 28 of the bed 16 for moving the sheets of glass along the bed.

Guide means, generally indicated at 34, are provided for engaging the sheets of glass 20 and 22 to position the respective sheets of glass in a predetermined orientation relative to the bed. The guide means 34 are in removable frictional driven engagement with the rollers 32 so that the guide means 34 are moved along the bed 16 by the rollers 32 while maintaining the respective sheets in their respective predetermined orientations. The guide means 34 are only in frictional driven engagement with the rollers; hence, the gude means 34 will continue to move with the respective sheets of glass when the end of the conveying means or last roller is reached. In other words, the guide means 34 may be freely moved in the direction of, independently of and away from the conveying means. Each guide means 34 has a first surface with sufficient area to permit frictional engagement thereof with and to be moved by the conveying means such as the rollers 32 in the illustrated embodiment. In addition, each guide means 34 has a second surface which corresponds to at least a portion of the periphery of the sheet for engaging the sheet to be conveyed by the conveying means such as the rollers 32 in the illustrated embodiment.

One of the guide means 34 takes the form of a bar-like member 36 which is removably disposed in frictional driven engagement with the rollers 32 and is in frictonal driving engagement with the sheet of glass 20. The sheet of glass 20 is floating on gases over the bed 16 and due to the tilt of the bed 16 a component of force urges the sheet 20 into frictional engagement with the bar-like member 36 so that as the rollers 32 move the bar-like member 36 along the bed, the sheet 20 is moved along the bed. It will be noted that the edge of the sheet of glass 2 which contacts the bar-like member 36 is not of sufficient length to at all times be in frictional driven contact with two adjacent rollers 32; thus, by utilizing the bar 36, the sheet of glass 20, which does not at all positions span the distance between two adjacent rollers, is moved along the bed by the rollers 32 while being maintained in a constant predetermined orientation.

The guide means may also take the form of a sheet-like member 38 which at least partially surrounds the sheet 22 in that it engages two edges of the sheet. The sheet-like member is in frictional driven engagement with the rollers 32 and moves the sheet 22 along the bed as the sheet is maintained in a predetermined orientation. The sheet-like member 38 may include flanges 40 which extend upwardly therefrom to provide a greater area for contacting the edges of the sheet of glass 22. It is understood that the pocket in the sheet-like member 38 may take one of various forms, which forms depend upon the shape of the sheet of glass and upon the desired predetermined orientation of the glass over the bed as it is moved along the bed.

The bar-like member 36 and sheet-like member 38 may also be fabricated so that they float on hot gases emitted from the passages 18 in the bed as they are moved along the bed by the rollers 32. Preferably, frame-like member 38 is tapered so that it becomes thinner adjacent its contact with the sheet 22.

As best illustrated in FIGURE 3, the bed 16 has a curved upper surface curved in a direction transversely to the longitudinal axis of the bed. Thus, as a sheet of glass is floated on hot gases and moved along the bed, it conforms to the curvature of the bed so that the sheet of glass is curved about a predetermined axis. The axis about which each respective sheet is curved depends upon the predetermined orientation of the sheet as it moves along the bed. Thus, by utilizing the guide means 34 of the instant invention, a sheet of glass may be bent or curved about one of various predetermined axes depending upon the preorientation of the sheet maintained by the respective guide means 34.

It is to be understood that while the invention has been illustrated in FIGURES 1 through 3 in association with conveying means comprising rollers 32, the guide means 34 may also be utilized with an endless type loop conveyor of the aforementioned type whereby the guide means 34 are disposed between adjacent fingers or arms which extend transversely of the conveyor loop.

Referring now to FIGURES 4 through 6, there is disclosed two alternative embodiments of the guide means 34 of the instant invention, both embodiments 44 and 46 taking the form of a sheet-like member. Each sheet-like member includes a plurality of openings which are indicated at 48 and 50 respectively. Preferably, each sheet-like member utilizes flanges, such as the flanges 52 in the sheet-like member 42 and the flanges 54 in the sheet-like member 46, to engage the edges of the respective sheets of glass. The sheet-like member 44 preorients and guides a plurality of sheets of glass 56 and the sheet-like member 46 preorients and guides a plurality of sheets of glass 58. The sheet-like members 44 and 46 are advantageously utilized to treat small pieces of glass in a large furnace so that a large furnace may be utilized efficiently. In addition, the air flow through the passages in the bed 16' is effected by the coverage over the bed, i.e., the area of the bed covered by a sheet of glass and/or sheet-like members 44 and 46, so that the sheet-like members 44 and 46 may be utilized to control the flow of fluid.

The sheet-like members 44 and 46 are preferably made of a thin material such as metal and are pliable so that they may be utilized in an apparatus having an elongated bed which is curved transversely to its longitudinal axis, such as the bed illustrated in FIGURES 2 and 3. As an example, sheet-like member 46 may be moved along the bed so as to maintain the sheets of glass 58 in respective predetermined orientations as the sheet-like member 46 and the sheets of glass 58 are floating and when the sheet-like member 46 reaches the curved portion of the bed, the sheet-like member 46 bends to conform to the curvature of the bed to allow the respective sheets of glass 58 to also bend and conform to the curvature of the bed while being guided along the bed.

As illustrated in FIGURES 4 through 6, a chain-like conveyor 60 is disposed on each side of the bed 16' and a rod 62 extends between the chain-like conveyors 60 and engages the trailing edge or extremity of the respective sheet-like members 44 and 46 to move them along the bed. FIGURE 7 discloses an alternative conveying means in that there is disclosed a conveyor track 64 disposed above the bed 16' with hanger members 66 depending from the moving conveyor and engaging the trailing edge or extremity of the respective sheet-like members 44 and 46 to move them along the bed 16'.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An apparatus for treating a sheet of glass comprising: flow control means for at least partially supporting a sheet on fluid, conveying means disposed along said flow control means and movable therealong, and guide means independent of said conveying means for engaging the sheet to position the sheet in a predetermined orientation and for placement into and removal from frictional driven engagement with said conveying means to maintain the sheet in said predetermined orientation while at least partially supported on said fluid and moved by said conveying means, said guide means being movable in the direction of and independently of said conveying means whereby said guide means may be moved independently of and away from said conveying means, said guide means having a first surface with sufficient area to permit said frictional engagement with and to be moved by said conveying means and a second surface corresponding to at least a portion of the periphery of the sheet for engaging the sheet to be conveyed by said conveying means, at least a portion of said second surface being disposed at an angle to said first surface.

2. An apparatus as set forth in claim 1 wherein said flow control means includes an elongated bed having at least a portion thereof curved transversely to the longitudinal axis so that the sheet may conform to the curvature of said curved portion of said bed while supported on said fluid and moved along said bed.

3. An apparatus as set forth in claim 1 wherein said guide means includes a sheet-like member at least partially surrounding the sheet and in frictional driven engagement with said conveying means thereby to move the sheet as the sheet is maintained in said predetermined orientation.

4. An apparatus as set forth in claim 3 wherein said conveying means includes a plurality of rollers and said sheet-like member is moved by frictionally engaging said rollers.

5. An apparatus as set forth in claim 3 wherein said sheet-like member includes a plurality of openings therethrough with each of said openings receiving a sheet of glass so that a plurality of sheets of glass are maintained in respective predetermined orientations.

6. An apparatus as set forth in claim 5 wherein said sheet-like member is at least partially supported on said fluid.

7. An apparatus as set forth in claim 6 wherein said conveying means engages the trailing extremity of said sheet-like member to move said sheet-like member along a path over said flow control means.

8. An apparatus as set forth in claim 1 wherein said guide means is at least partially supported on said fluid.

9. In an apparatus as set forth in claim 3 wherein said sheet-like member is pliable and at least partially supported on said fluid.

10. An apparatus as set forth in claim 6 wherein said flow control means includes an elongated bed having at least a portion thereof curved transversely to the longitudinal axis and said sheet-like member is pliable so as to conform to the curvature of said bed so that said sheets of glass may bend to conform to the curvature of said bed as said sheet-like member maintains the sheets of glass in said respective predetermined orientations.

11. An apparatus as set forth in claim 1 wherein said flow control means includes an elongated bed having at least a portion thereof curved transversely to the longitudinal axis, said bed having a plurality of passages therein for providing fluid over said bed, means for supplying fluid through said passages to at least partially support a sheet on fluid above said bed, said bed being tilted about the longitudinal axis thereof so that one longitudinal edge thereof is lower than the other, said conveying means being disposed along the lower longitudinal edge of said bed.

12. An apparatus for treating a sheet of glass comprising; flow control means for at least partially supporting a sheet on fluid, conveying means disposed along said flow control means and movable therealong, and guide means independent of said conveying means for engaging the sheet to position the sheet in a predetermined orientation and for placement into and removal from frictional driven engagement with said conveying means to maintain the sheet in said predetermined orientation while at least partially supported on said fluid and moved by said conveying means, said guide means being movable in the direction of and independently of said conveying means whereby said guide means may be moved independently of and away from said conveying means, said guide means having a first surface with sufficient area to permit frictional engagement with and to be moved by said conveying means and a second surface corresponding to at least a portion of the periphery of the sheet for engaging the sheet to be conveyed by said conveying means, said second surface being disposed in parallel relationship to said first surface.

13. An apparatus as set forth in claim 12 wherein said flow control means includes an elongated bed having at least a portion thereof curved transversely to the longitudinal axis so that the sheet may conform to the curvature of said curved portion of said bed while supported on said fluid and moved along said bed.

14. An apparatus as set forth in claim 12 wherein said guide means includes an elongated bar-like member removably disposed in frictionally driven engagement with said conveying means and in frictional driving engagement with the sheet.

15. An apparatus as set forth in claim 14 wherein said conveying means includes a plurality of rollers and said bar-like member is moved by frictionally engaging said rollers.

16. An apparatus as set forth in claim 12 wherein said guide means is at least partially supported on said fluid.

17. In an apparatus as set forth in claim 12 wherein said guide means is pliable and at least partially supported on said fluid.

18. An apparatus as set forth in claim 12 wherein said flow control means includes an elongated bed having at least a portion thereof curved transversely to the longitudinal axis, said bed having a plurality of passages therein for providing fluid over said bed, means for supplying fluid through said passages to at least partially support a sheet on fluid above said bed, said bed being tilted about the longitudinal axis thereof so that one longitudinal edge thereof is lower than the other, said conveying means being disposed along the lower longitudinal edge of said bed.

References Cited

UNITED STATES PATENTS 3,338,697    8/1967    McMaster et al.

ARTHUR D. KELLOGG, Primary Examiner

U.S. Cl. X.R.

65—25, 107, 350, 351; 214—1